(12) United States Patent
Kuenzli

(10) Patent No.: US 7,625,163 B2
(45) Date of Patent: Dec. 1, 2009

(54) ROOF STOWAGE SYSTEM

(75) Inventor: Casey Kuenzli, Middleton, ID (US)

(73) Assignee: Triple K, LLC, Middleton, ID (US)

( * ) Notice: Subject to any disclaimer, the term of this patent is extended or adjusted under 35 U.S.C. 154(b) by 583 days.

(21) Appl. No.: 11/266,062

(22) Filed: Nov. 2, 2005

(65) Prior Publication Data

US 2007/0098532 A1    May 3, 2007

(51) Int. Cl.
*B60P 7/08* (2006.01)
(52) U.S. Cl. ............... 410/24; 410/4; 410/14; 410/15; 410/29; 414/546
(58) Field of Classification Search .......... 410/2–4, 410/14, 15, 18, 24, 26, 29, 29.1, 136; 224/282, 224/309, 553; 296/3; 414/350, 462, 471, 414/546
See application file for complete search history.

(56) References Cited

U.S. PATENT DOCUMENTS 3,902,613 A * 9/1975 Newland
7,455,489 B1 * 11/2008 Klev et al. .................. 410/4

* cited by examiner

*Primary Examiner*—Stephen Gordon
(74) *Attorney, Agent, or Firm*—Zarian Midgley & Johnson PLLC

(57) ABSTRACT

A roof stowage system includes a support having a first end and a second end opposite the first end. The second end is pivotably coupled, at least indirectly, to the roof. A lift is coupled to the support and operable to selectively cause the support to pivot between a first position and a second position. The support is generally parallel with and adjacent to the roof when in the first position. The first end of the support is generally adjacent to a floor when in the second position.

14 Claims, 22 Drawing Sheets

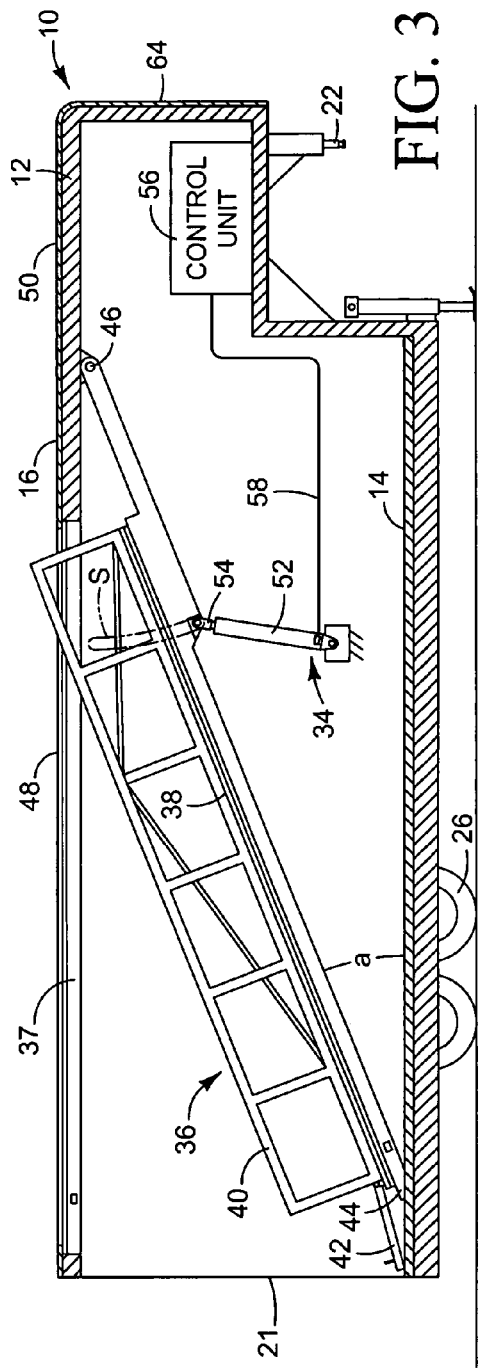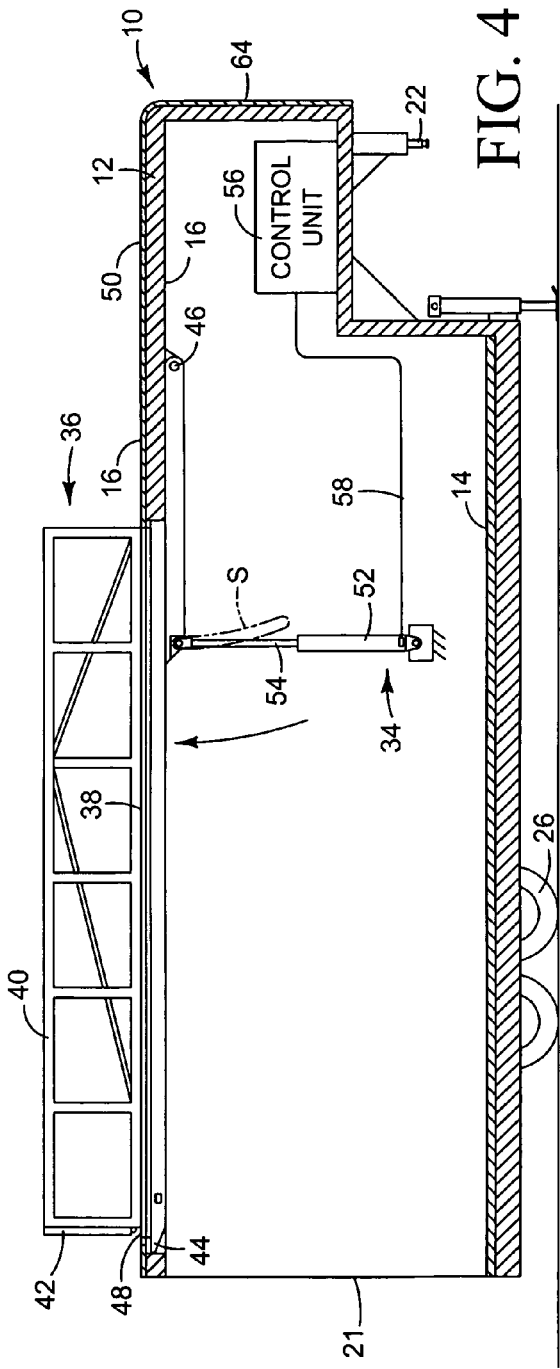

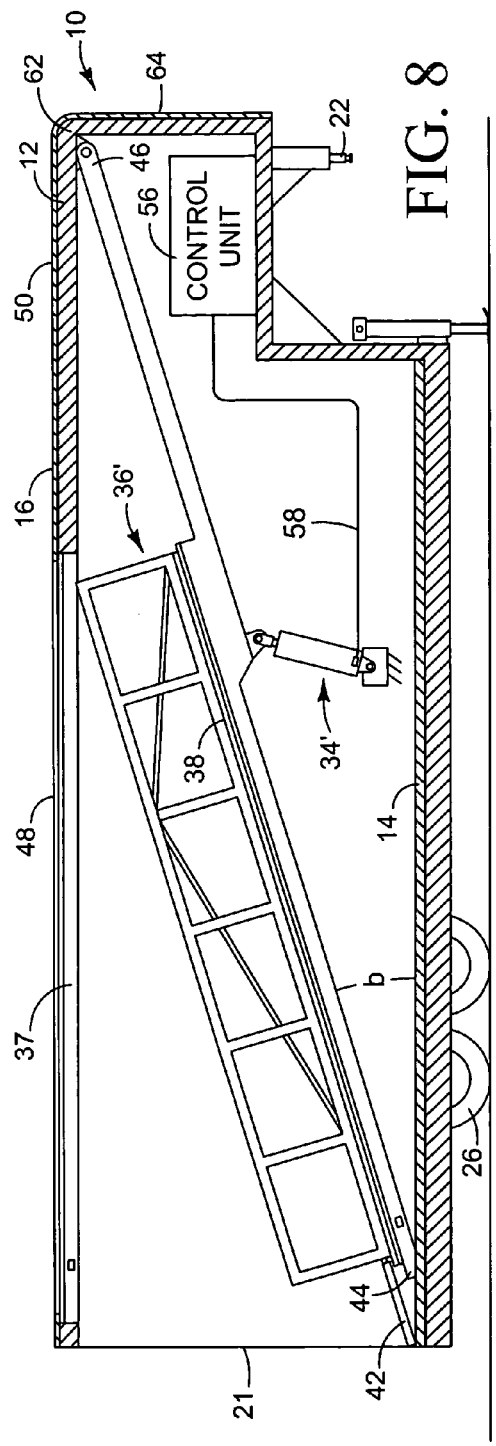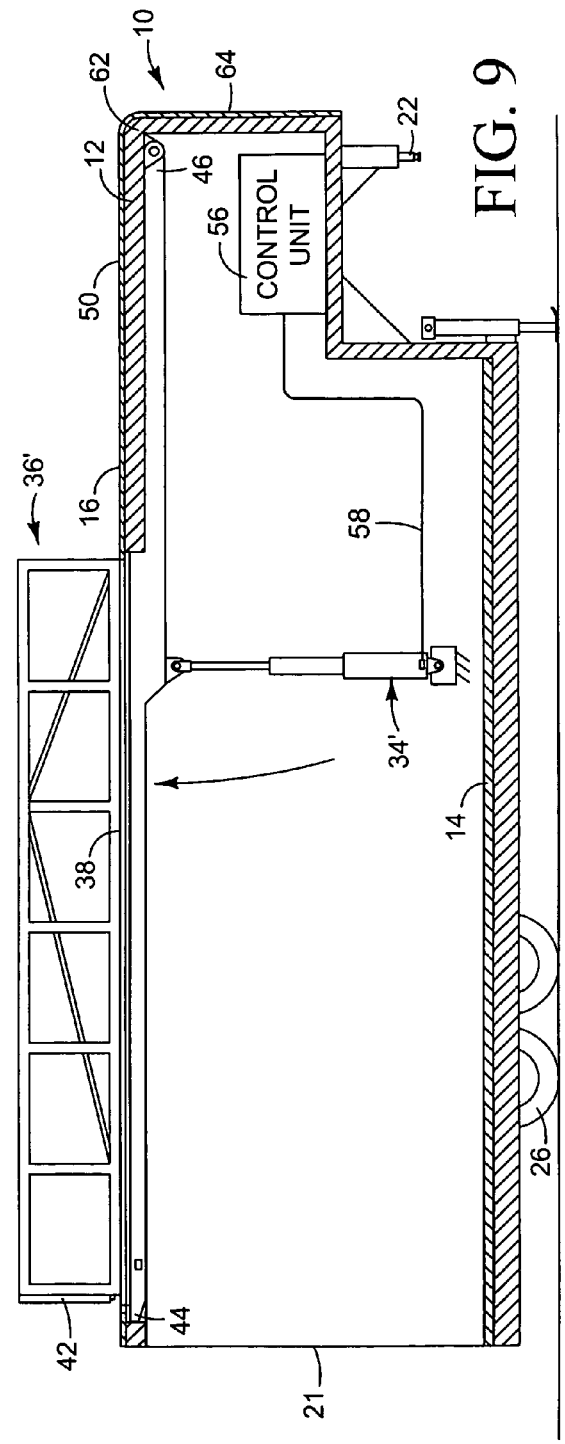

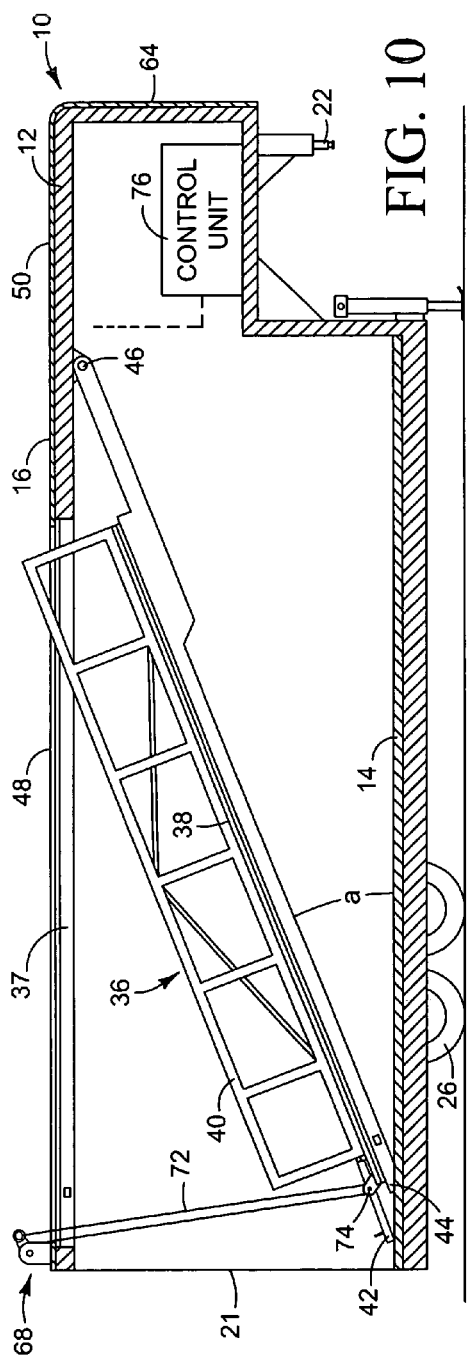
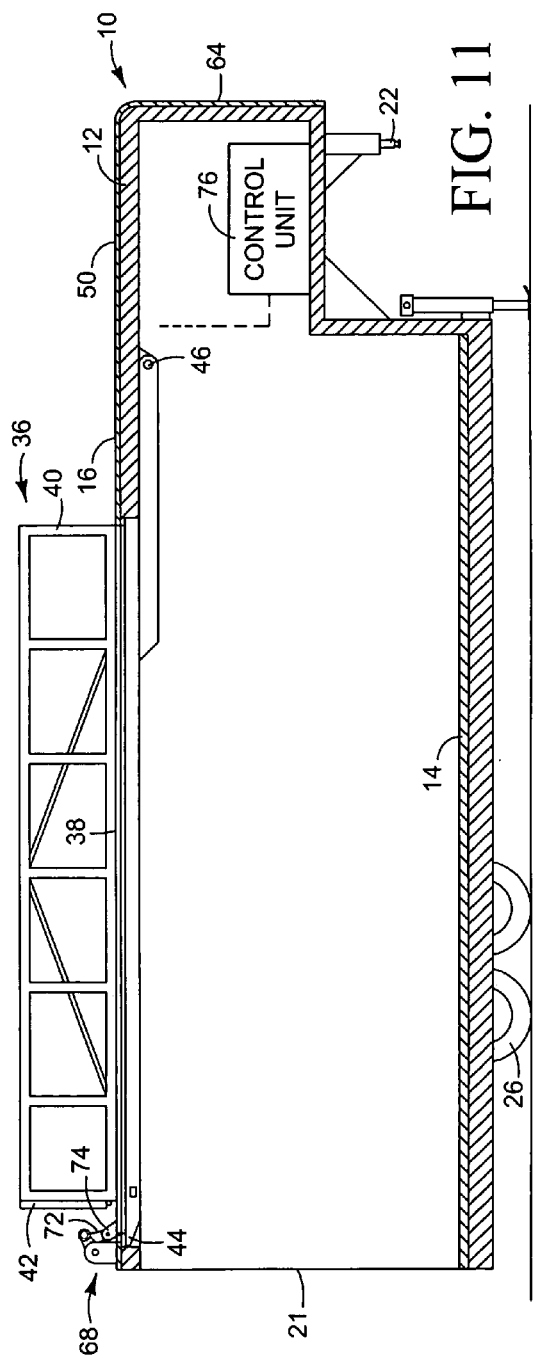

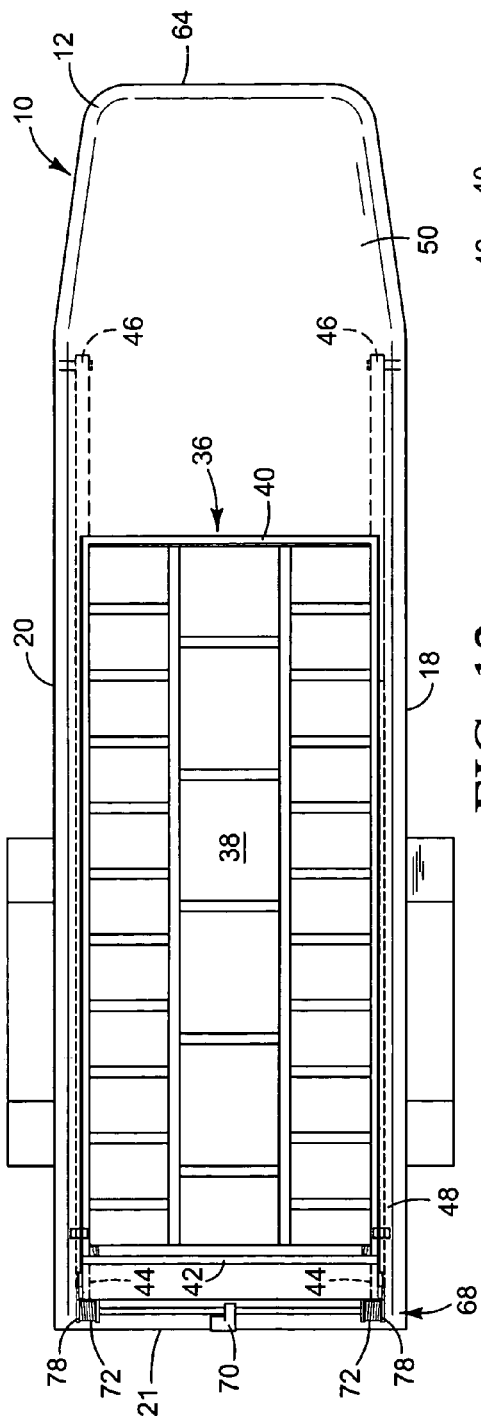
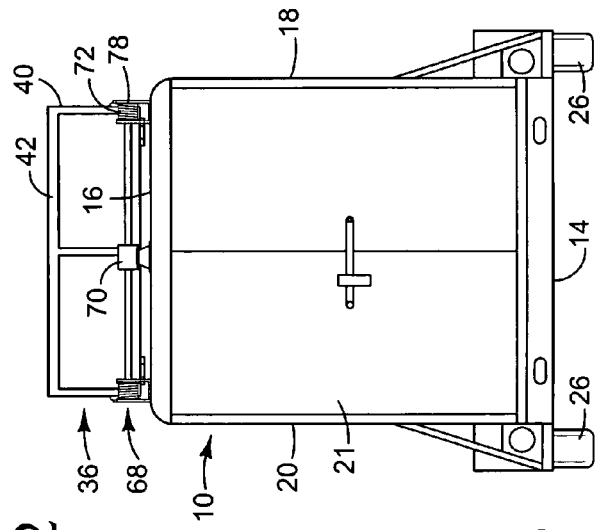
FIG. 12
FIG. 13

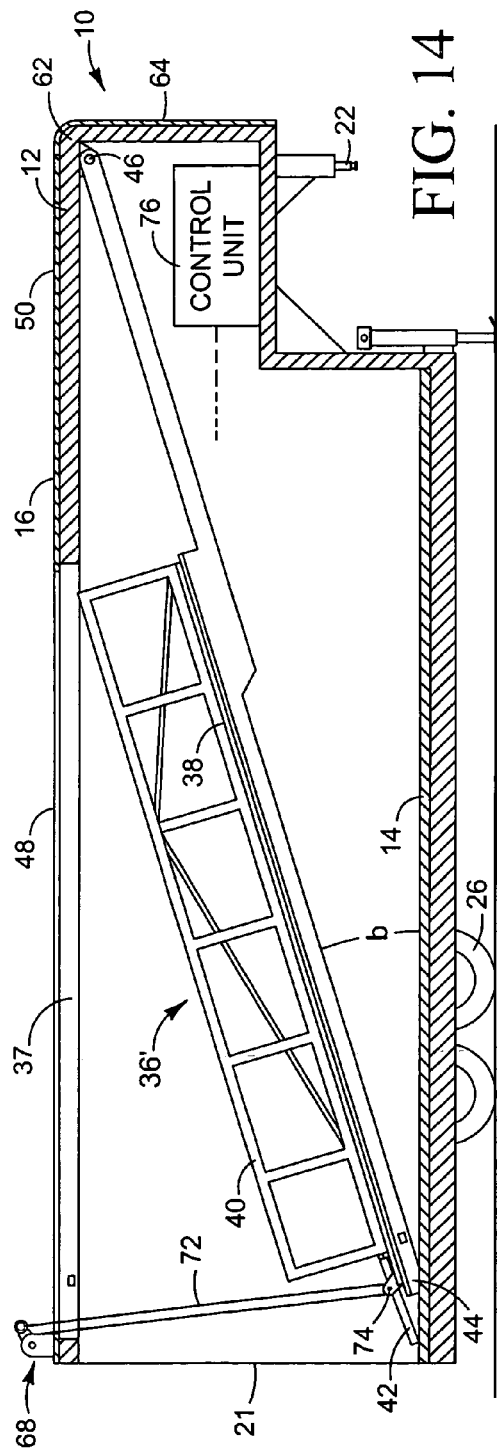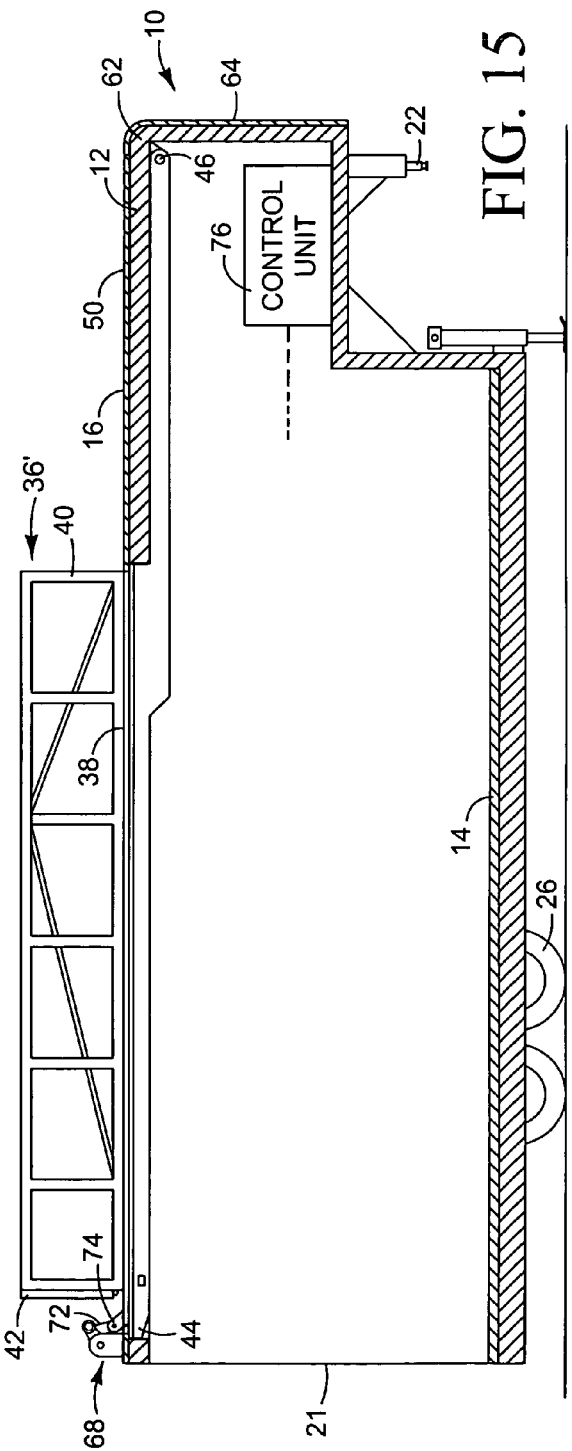

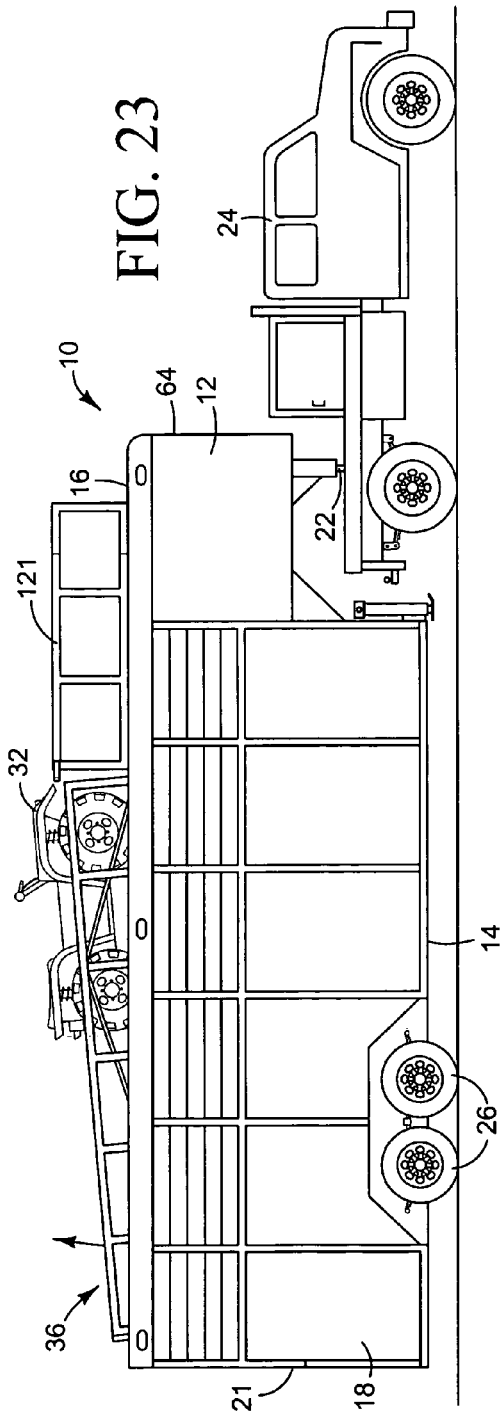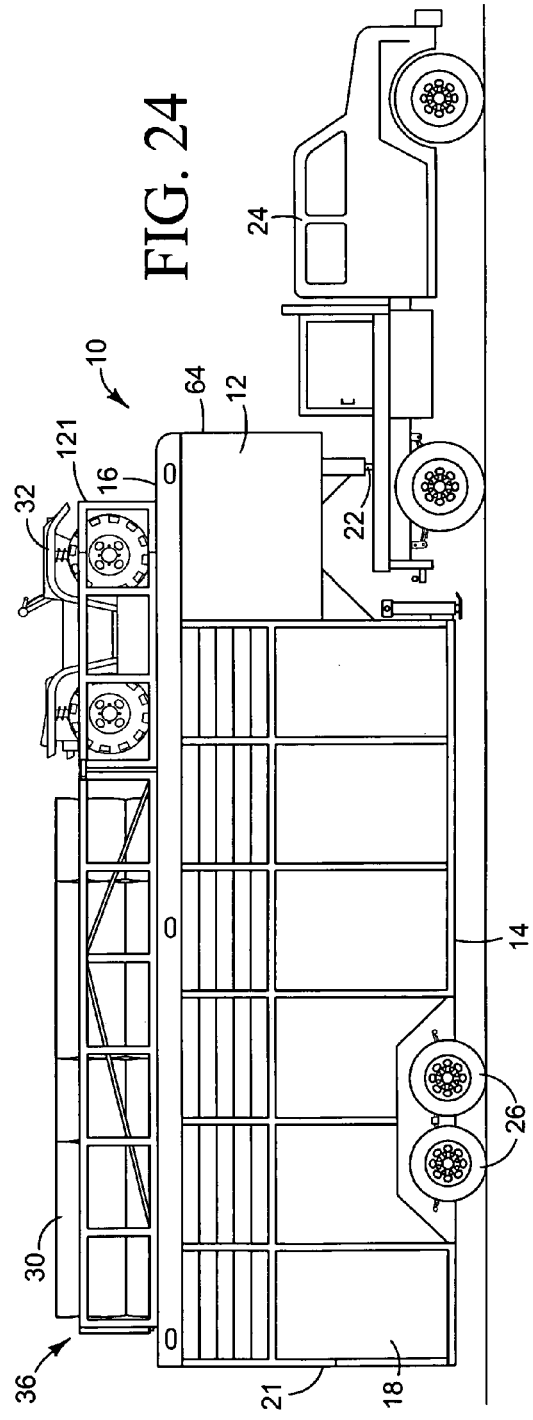

ROOF STOWAGE SYSTEM

BACKGROUND

Trailers often include fixed roof stowage areas that are accessed using a ladder. Such access limits the type of items that can be stowed. For example, some horse trailers include a fixed roof stowage area for bales of hay. A hay bale is too heavy for many to lift—let alone lift onto or remove from the roof of a trailer. In such cases two or more individuals are needed to complete the task. For even larger items such as all terrain vehicles, roof stowage is simply not an option.

DESCRIPTION OF THE DRAWINGS

FIGS. 3-9 illustrate a roof stowage system that utilizes a hydraulic lift to pivot a support between a lowered position and a raised position according to an embodiment.

FIGS. 10-15 illustrate a roof stowage system that utilizes a winch lift to pivot a support between a lowered position and a raised position.

FIGS. 21-30 illustrate alternate trailer configurations according to various embodiments.

DETAILED DESCRIPTION

INTRODUCTION: Various embodiments provide a pivoting support enabling roof stowage of cargo items. As described in more detail below, the support can be lowered to an accessible level within the trailer's interior and then raised back up allowing cargo items placed on the support to be stowed at roof level.

Figure 1:
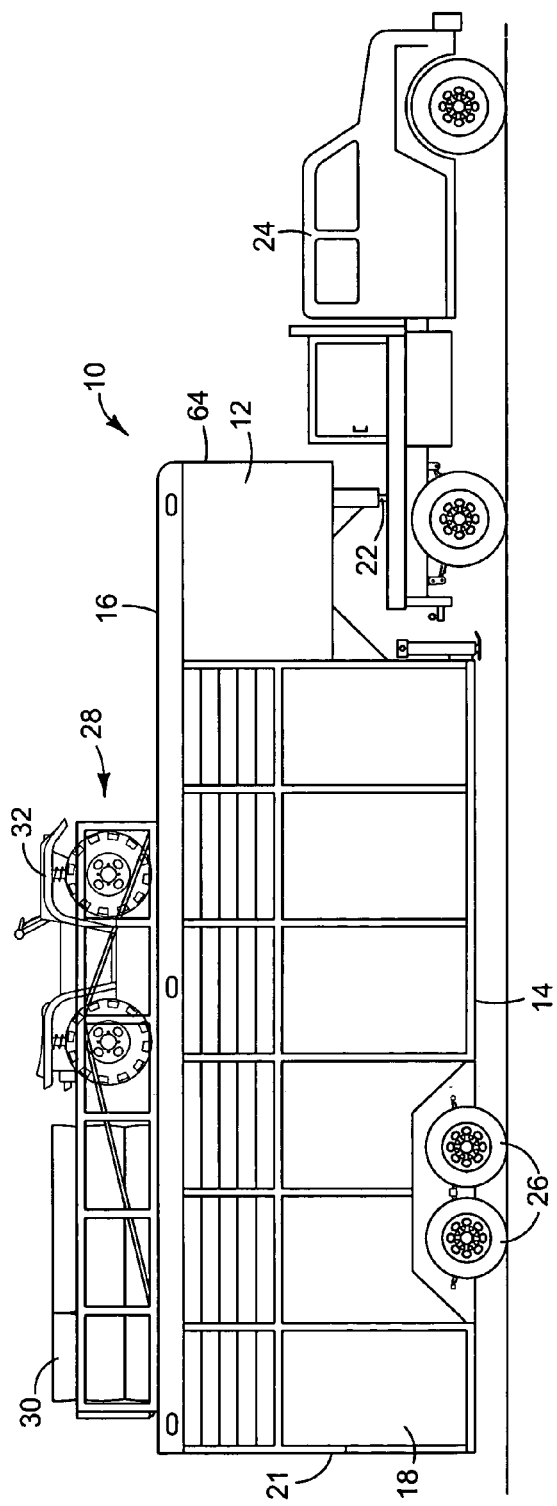
FIGS. 1 and 2 illustrate an exemplary trailer 10 in which embodiments of the present invention may be implemented.
Figure 2:
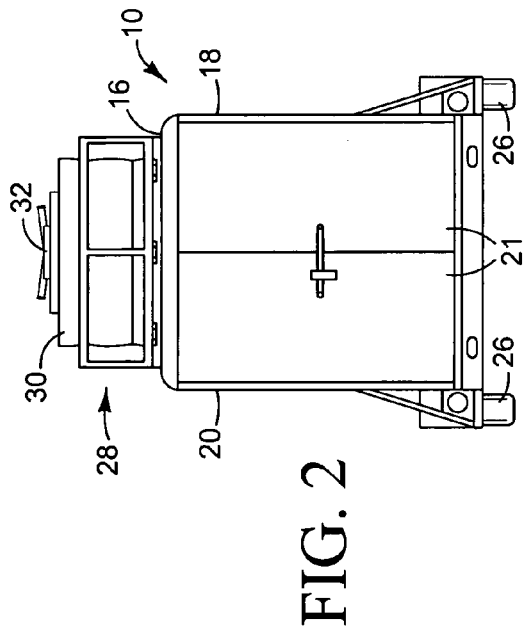
Figure 5:
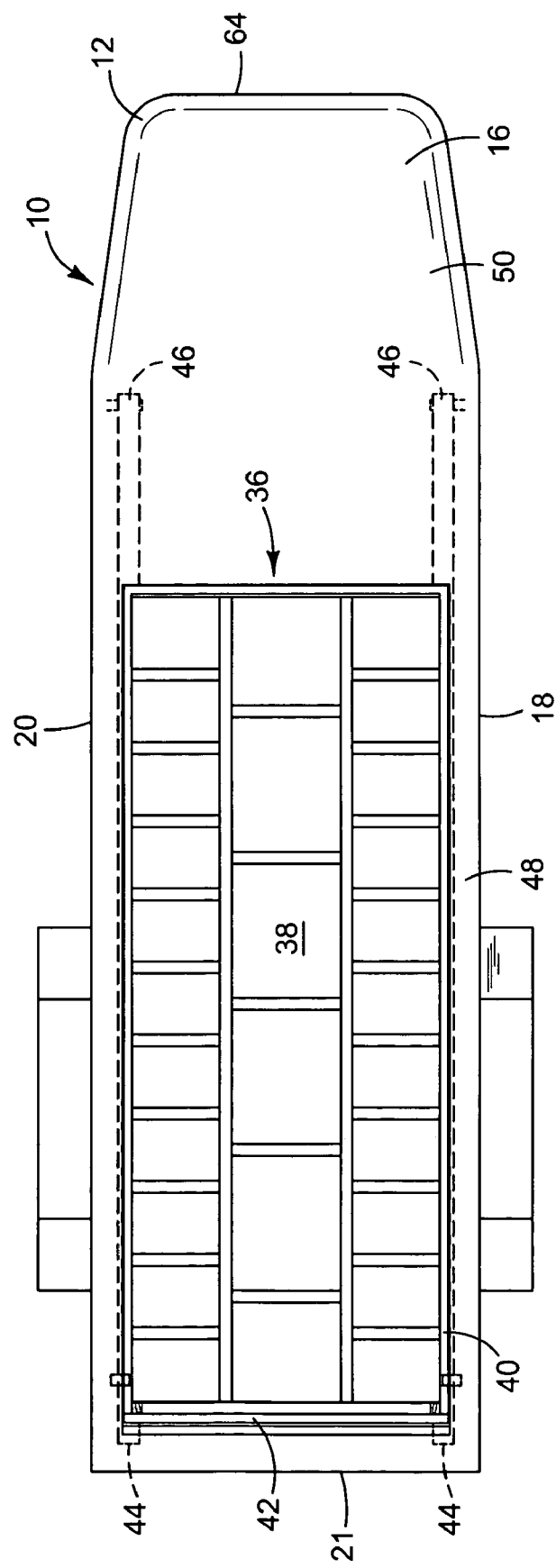

FIGS. 1 and 2 illustrate an exemplary trailer 10 in which embodiments of the present invention may be implemented. Trailer 10 includes body 12. Body 12 includes floor 14, roof 16, and opposing sidewalls 18 and 20 all of which define and surround an interior space (not visible) of trailer 10. Trailer 10 includes rear access door 21 though which cargo items can be passed into and removed from the trailer's interior space. Trailer 10 also includes hitch 22 for coupling trailer 10 to vehicle 24 and wheels 26 allowing trailer 10 to be pulled. Trailer 10 includes roof stowage area 28 for showing cargo items 30 and 32 at the level of roof 16. As described below, various embodiments operate to pivot the stowage area lowering it into the interior space of trailer 10 where cargo items 30 and 32 can be more easily removed.

PIVOTING CARGO SUPPORT WITH HYDRAULIC LIFT: FIGS. 3-9 illustrate an embodiment of a roof stowage system that utilizes a hydraulic lift 34 to pivot support 36 between a lowered position (FIGS. 3, 8) and a raised position (FIGS. 4, 9). Starting with FIGS. 3-5, support 36 is shaped to fit within and fill an opening 37 formed in roof 18 when in the raised position. Support 36 includes a planar surface 38 surrounded by a cage 40 for supporting cargo items. Cage 40 includes a door 42 that opens/lowers to allow cargo items to be more easily placed on and removed from planar support 38 through rear access door 21.

Support 36 includes a first end 44 and a second end 46. First end 42 engages floor 14 when support 36 is pivoted down into the lowered position as shown in FIG. 3. Second end 44 is pivotably coupled to body 12. As hydraulic lift 34 raises support 36, support 36 pivots about its second end until planar surface 38 fits within and fills opening 37 as illustrated in FIG. 4. Here planar surface 38 is generally parallel to roof 16 and is oriented to allow for roof storage of cargo items as depicted in Figs 1 and 2.

Roof 16 is separated into two sections 48 and 50. Section 48 includes opening 37. The second end 46 of support 46 is pivotably coupled to trailer body 12 at or near second section 50 of roof 16. When support 36 is in the lowered position, planar surface 38 is oriented at an angle (a) relative to floor 14. The value of (a) is dependent upon the height of the interior space of trailer body 12 and the length of support 36 defined by a distance between support ends 44 and 46. Assuming the height of the interior space to be fixed, increasing the length of support 36 will decrease the value of (a) making it easier to load some types of cargo items on to planer surface 38.

Figure 7:
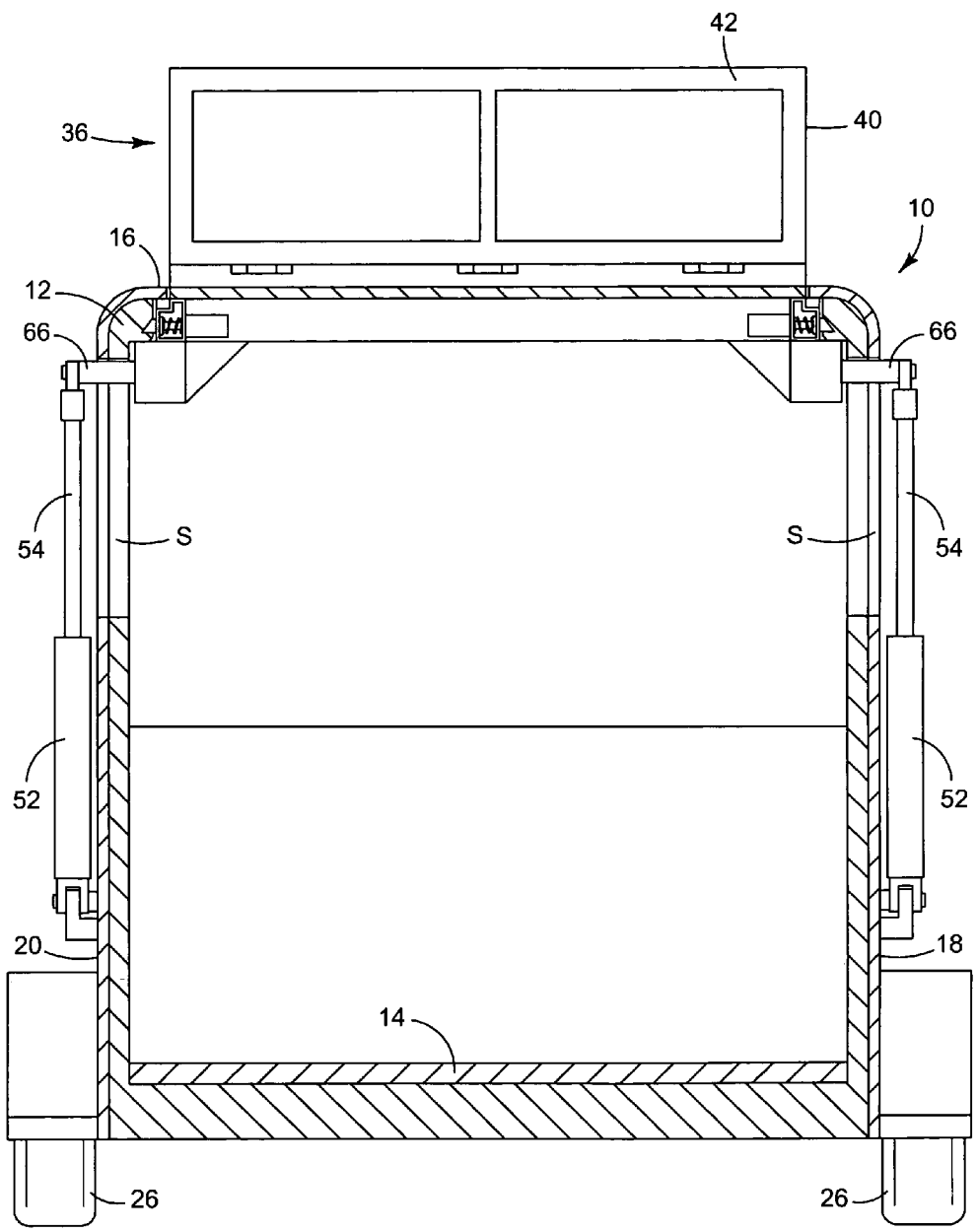
Figure 16:
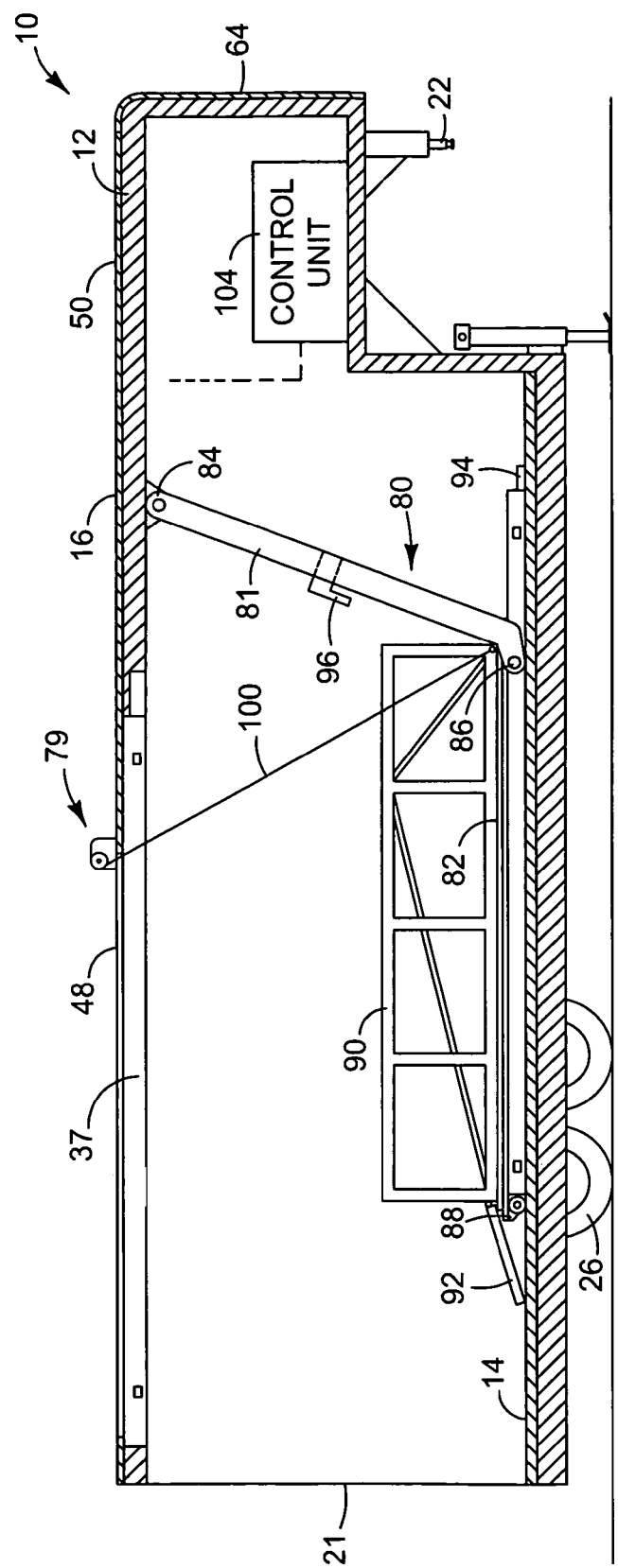
FIGS. 16-19 illustrate a roof stowage system that utilizes a winch lift to pivot an articulating support between a lowered position, an intermediate position, and a raised position.

Hydraulic lift 34 includes cylinders 52 with extendable and retractable rods 54. Note that only a single cylinder and rod pair is visible in FIGS. 3 and 4. Two rod and cylinder pairs are visible in FIGS. 7 and 8. Cylinder 52 is coupled to control unit 56 via pressure line 58. The extending end of rod 54 is pivotably coupled to support 36 while cylinder 52 is pivotably coupled to trailer body 12. Control unit is responsible for powering and controlling hydraulic lift 34. Control unit 56 applies fluid pressure to cylinder 52 forcing rod 54 to extend outward pivoting support 36 into the raised position as depicted in FIG. 4. As control unit 56 removes the fluid pressure from cylinder 52, rod 54 is retracted pivoting support 36 to the lowered position depicted in FIG. 3. As illustrated in FIGS. 7 and 8, cylinder and rod pairs 52/54 can be positioned within the interior space of trailer body 12 or outside of that interior space.

Figure 6:
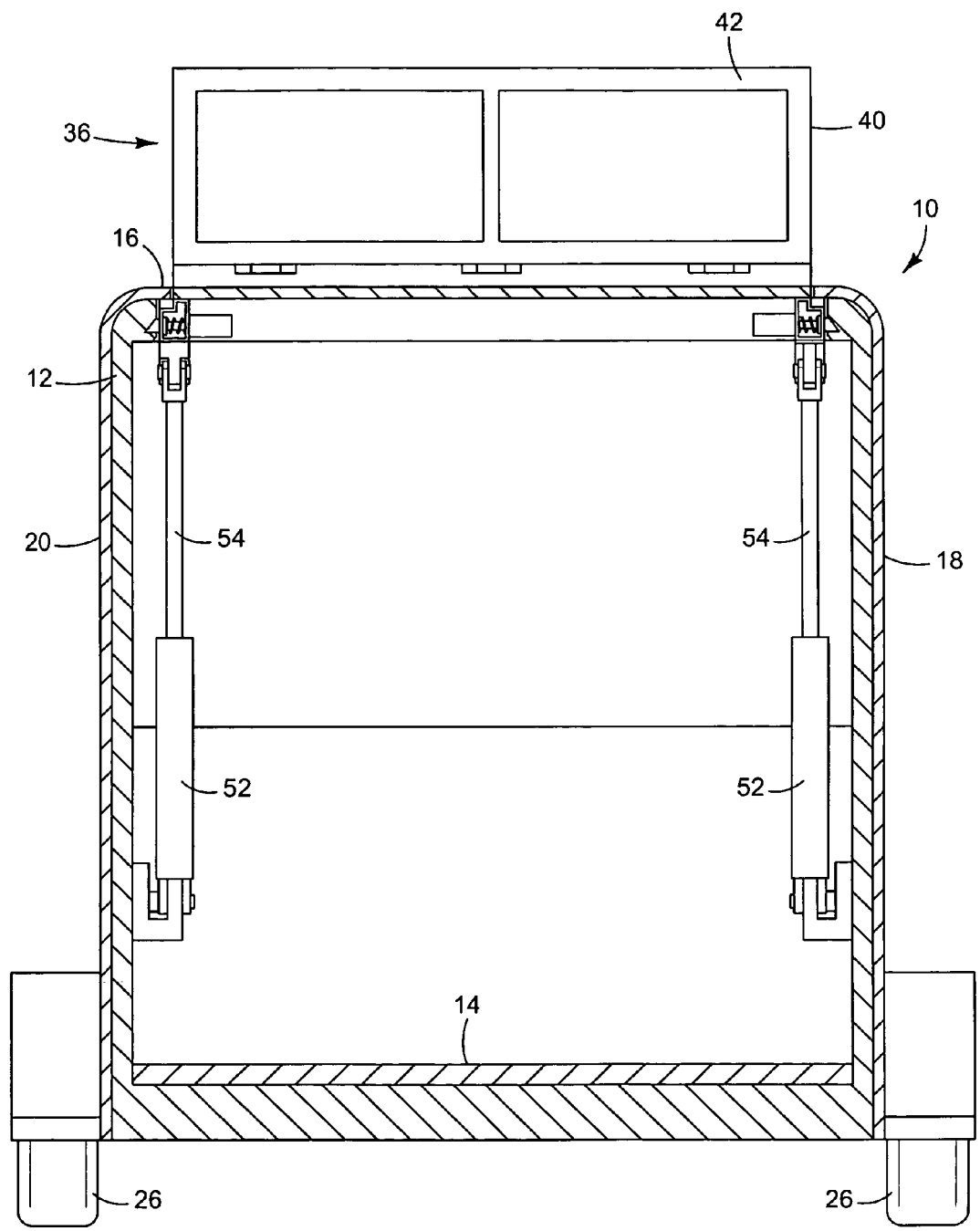

Moving to FIGS. 6 and 7, cylinders 52 and rods 54 of hydraulic lift 36 may be coupled to body 12 and located within the interior space of trailer 10 as depicted in FIG. 6 or coupled to body 12 and located on the exterior of body 12 as depicted in FIG. 8. In the Example of FIG. 6, cylinders 52 are pivotably coupled to the interior sides of sidewalls 18 and 20 while rods 54 are pivotably coupled to support 36. Alternatively, cylinders could be coupled to support 36 and rods could be coupled to body 12.

In FIG. 7, cylinders are pivotably coupled to the exterior sides of sidewalls 18 and 20. In this case support 36 includes extension pins extending outward through arced slots (S) (depicted in FIGS. 3 and 4) formed in sidewalls 18 and 20. Rods 54 are then pivotably coupled to extension pins 66. As support 36 is raised and lowered pivoting about its second end 46 (FIGS. 3 and 4), extension pins 66 travel arced paths defined by slots (S).

Moving to FIGS. 8 and 9, a longer example of support 36' is shown. Once again, the length of support 36' is defined by the distance between support ends 44 and 46. In this example, support end 46 is pivotably coupled to body 12 along an axis that is generally adjacent to an intersection 62 between roof 16 and front wall 64 of body 12. Front wall 64 is located opposite rear access door 21. In this example, when support 36 is in the lowered position, planar surface 38 is oriented at an angle (b) relative to floor 14. Because the length of support 36' is greater than that of support 36 (depicted in FIGS. 3 and 4), the value of (b) is less than that of (a) (depicted in FIGS. 3 and 4) creating a shallower incline for planer support 38. The shallower the incline, the easier it is to place cargo items such as all terrain vehicles on planar support 38.

PIVOTING CARGO SUPPORT WITH WINCH LIFT: FIGS. 10-15 illustrate an embodiment of a roof stowage system that utilizes a winch lift 68 to pivot support 36 between a lowered position (FIGS. 10, 14) and a raised position (FIGS. 11, 15). Starting with FIGS. 10-1 3, support 36 is shaped to fit within and fill an opening 37 formed in roof 18 when in the raised position. Starting with FIGS. 10-13, support 36 includes a planar surface 38 surrounded by a cage 40 for supporting cargo items. Cage 40 includes a door 42 that opens/lowers to allow cargo items to be more easily placed on and removed from planar support 38 through rear access door 21.

Winch lift 68 includes winch 70, cables 72, pulleys 74, and winch power and control unit 76. Winch 70 is coupled to roof 16 of body 12 and may be one of any number of varying types. For example, winch 70 may be electrical, air powered, or even hydraulic. Control unit 76 is responsible for powering and controlling winch 70 and is thus configured to supply the appropriate power type to winch 70. One end of each cable 72 is coupled to a rotatable spool 78 (seen in FIGS. 12 and 13) provided by winch 70, the other end is coupled to a fixed support provided by winch 70 or roof 16. Cables 72 pass around pulleys 74 which are coupled to first end 44 of support 36. As winch 70 winds cables 72 onto its spools 78, support 36 is pivoted to the raised position depicted in FIG. 11. As winch 70 unwinds cables 72 from its spools, support 36 is pivoted to the lowered position depicted in FIG. 10.

Roof 16 is separated into two sections 48 and 50. Section 48 includes opening 37. The second end 46 of support 36 is pivotably coupled to trailer body 12 at or near second section 50 of roof 16. When support 36 is in the lowered position, planar surface 38 is oriented at an angle (a) relative to floor 14. The value of (a) is dependent upon the height of the interior space of trailer body 12 and the length of support 36 defined by a distance between support ends 44 and 46. Assuming the height of the interior space to be fixed, increasing the length of support 36 will decrease the value of (a) making it easier to load some types of cargo items on to planer surface 38.

Moving to FIGS. 14 and 15, a longer example of support 36' is shown. Once again, the length of support 36' is defined by the distance between support ends 44 and 46. In this example, support end 46 is pivotably coupled to body 12 along an axis that is generally adjacent to an intersection 62 between roof 16 and front wall 64 of body 12. Front wall 64 is located opposite rear access door 21. In this example, when support 36 is in the lowered position, planar surface 38 is oriented at an angle (b) relative to floor 14. Because the length of support 36' is greater than that of support 36 (depicted in FIGS. 10-13), the value of (b) is less than that of (a) (depicted in FIGS. 10-13) creating a shallower incline for planer support 38. The shallower the incline, the easier it is to place cargo items such as all terrain vehicles on planar support 38.

Figure 17:
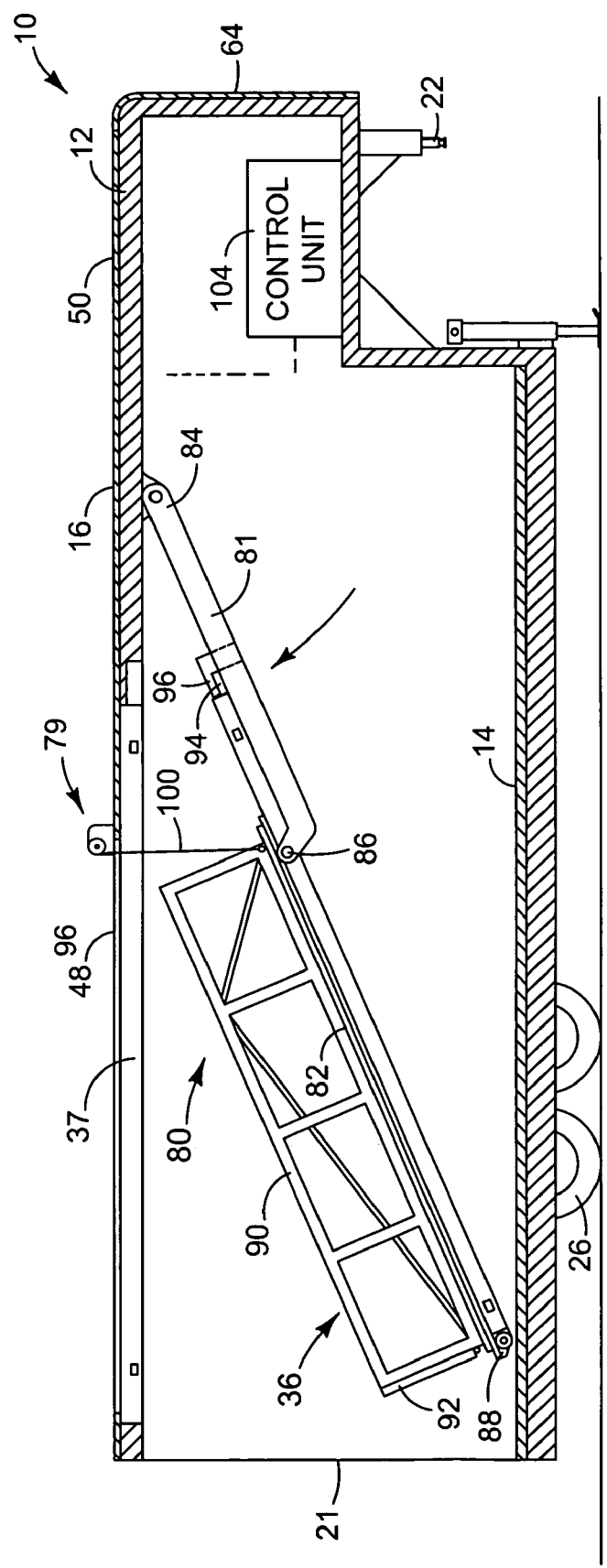
Figure 18:
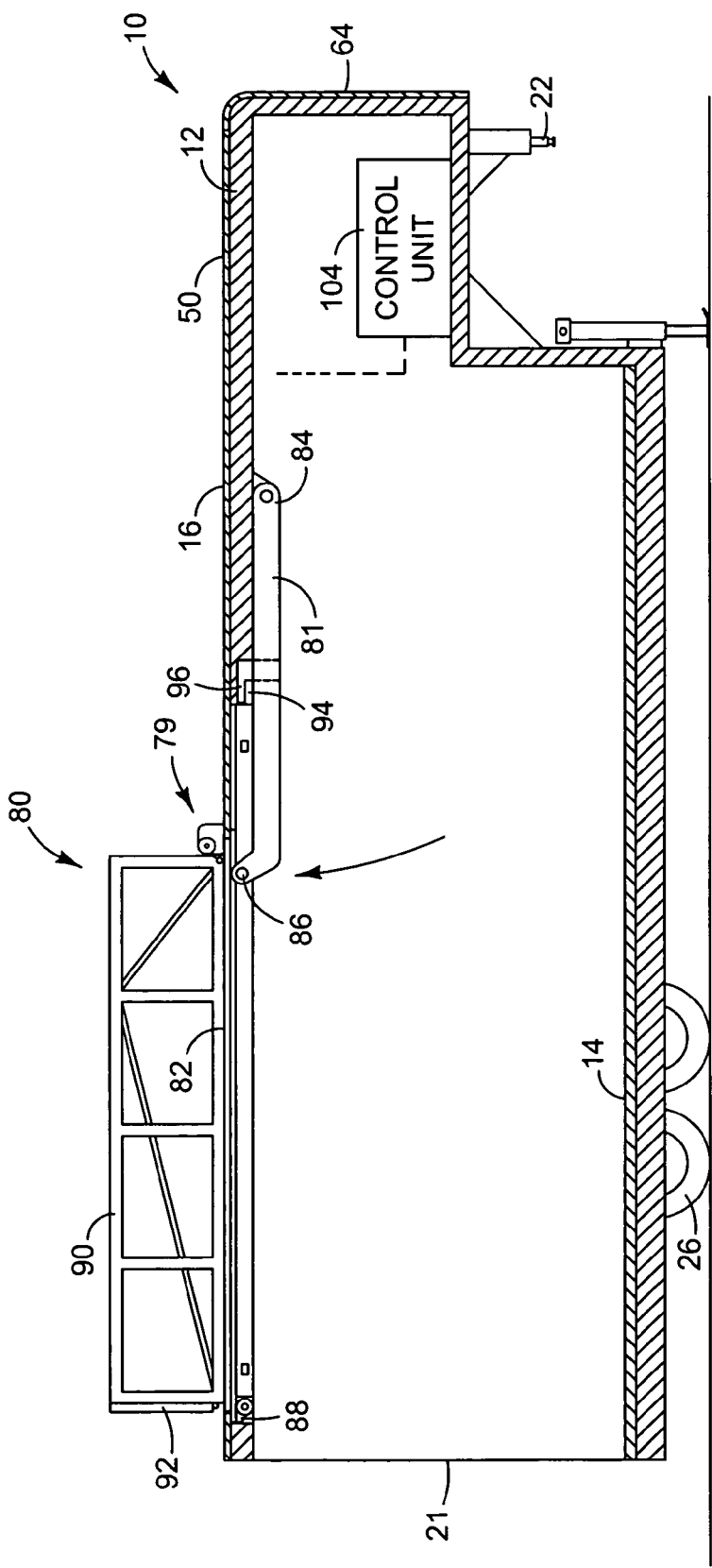

ARTICULATING CARGO SUPPORT WITH WINCH LIFT: FIGS. 16-19 illustrate an embodiment of a roof stowage system that utilizes a winch lift 79 to pivot articulating support 80 between a lowered position (FIG. 16), an intermediate position (FIG. 17), and a raised position (FIG. 18). Articulating support 80 is shaped to fit within and fill an opening 37 formed in roof 18 when in the raised position. Support 80 includes arms 81 (seen in FIG. 19) and planar surface 82. Second end (84) of each arm 81 is pivotably coupled to roof 16 of trailer body 12. First end of each arm is coupled to a pivot point 86 of planar surface 82. Planar surface 82 includes a first end 88 generally opposite pivot point 86. Planar surface 82 is surrounded by a cage 90 for supporting cargo items. Cage 90 includes a door 92 that opens/lowers to allow cargo items to be more easily placed on and removed from planar support 82 through rear access door 21.

Figure 19:
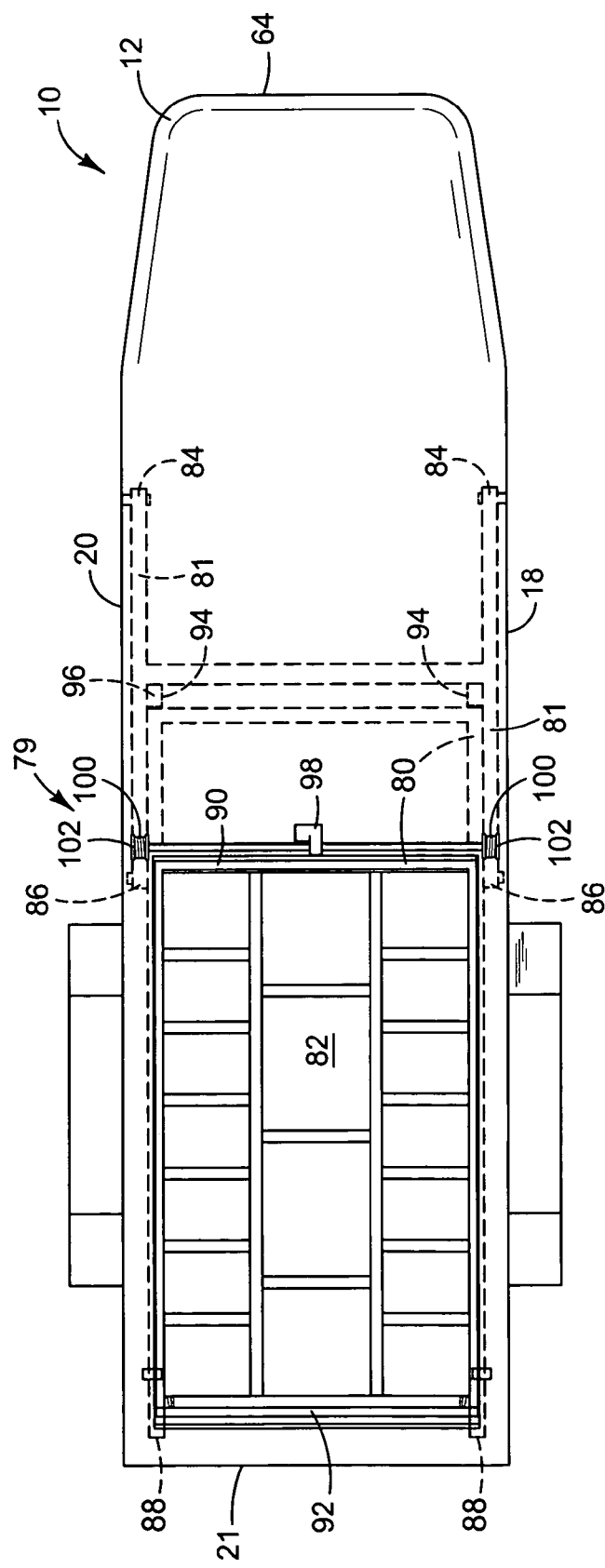

Planar surface 82 includes a limiter 94 extending in a direction opposite of first end 88. Arms 81 include stop 96. As support 80 is articulated to the raised position, arms pivot upward about second ends 84. Planar surface 82 pivots about pivot point 86 until limiter 94 engages stop 96 as depicted in FIG. 17. At this point planar surface remains generally parallel to arms 81 as support 80 continues to pivot about second end 84 until planar surface 82 is raised to fill opening 37 in roof 16 as depicted in FIGS. 18 and 19.

Winch lift 79 is shown to include winch 98, cables 100, spools 102, and control unit 104. Winch 98 is coupled to roof 16 of body 12 and may one of any number of varying types. For example, winch 98 may be electrical, air powered, or even hydraulic. Control unit 104 then is configured control winch 98 supplying the appropriate power type. One end of cable 100 is coupled to a rotatable spool 102 provided by winch 98, the other end is coupled to support 80 at or near pivot point 86. As winch 98 winds cables 100 onto its spools 102, support 86 is pivoted to the intermediate position of depicted in FIG. 17 and then to the raised position depicted in FIG. 18. As winch 98 unwinds cables 100 from its spools 102, support 80 is pivoted to the intermediate position depicted in FIG. 17 and then articulated to the lowered position depicted in FIG. 16. In the lowered position, planar support 82 is parallel with floor making it easier to load cargo items.

It is noted that stop 96 and limiter 94 can be of any configuration capable of preventing planar surface 82 from pivoting relative to arms 81 as support 80 is pivoted between the intermediate position of FIG. 17 and the raised position of FIG. 18. As support 80 is lowered and first end 88 contacts floor 14, limiter 94 disengages from stop 96 and planar surface pivots about pivot point 86 until planer surface 88 is parallel with and engages floor 14.

It is also noted that, a winch lift 79 could be replaced with one of any number of other mechanisms capable of raising and lowering support 80. For example, a hydraulic lift similar to hydraulic lift 34 of FIGS. 2-9 could be used to achieve the same results.

Figure 20:
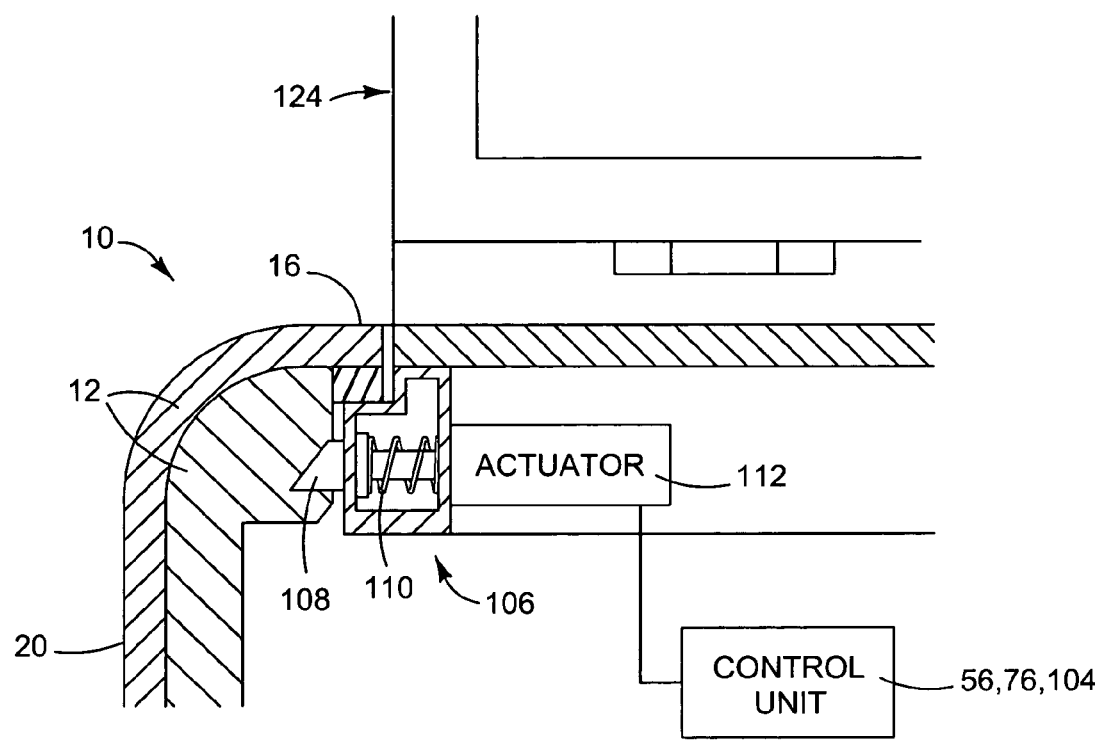
FIG. 20 illustrates an exemplary latch system 106 for use in holding a support in a raised position according to an embodiment.
Figure 21:
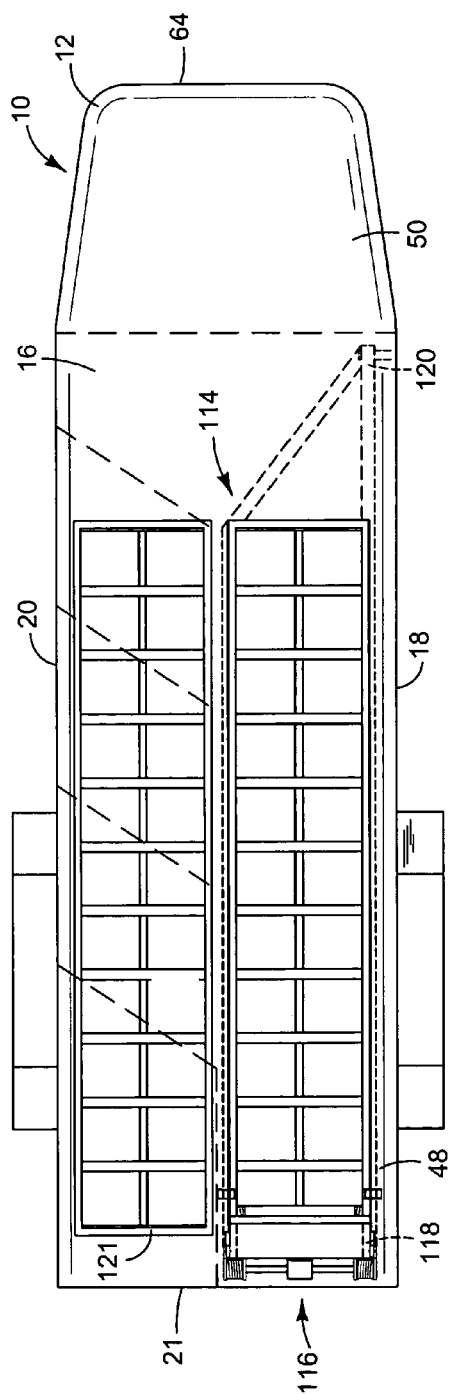
Figure 22:
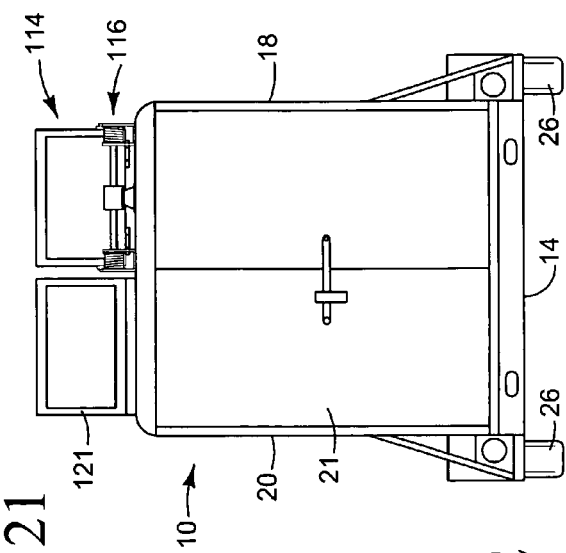
Figure 25:
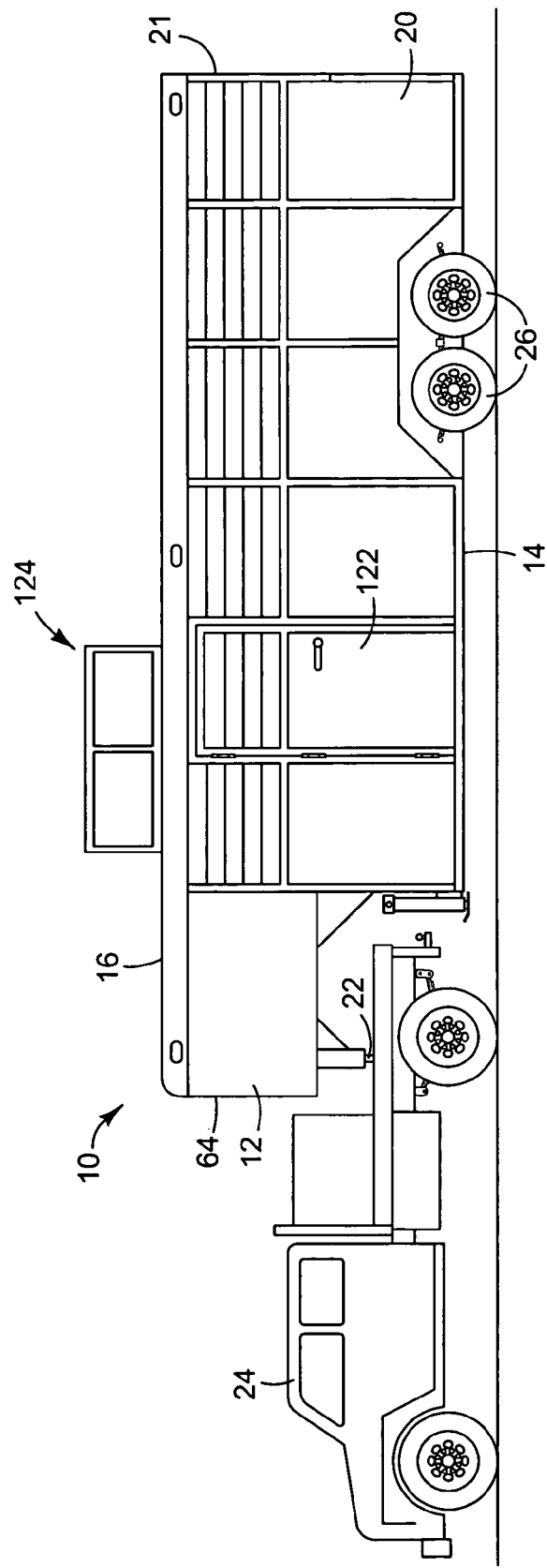

LATCH: FIG. 20 illustrates an exemplary latch system 106 for for use in holding support 36 and 80 in the raised position. Latch system 106 includes a wedge latch 108, a biasing element 110, and an actuator 112. Biasing element 110 (shown as a compression spring) holds wedge latch in a normally extended position. As support 36, 80 is lifted to the raised position, the extended wedge latch engages trailer body 12. The continued motion of support 36, 80 overcomes biasing element 110 and retracts wedge latch 108. Once support 36, 80 reaches the raised position, biasing element 110 extends wedge latch into a slot formed in trailer body 12 thus securing support 36, 80.

Actuator 112 represents generally any mechanism for overcoming biasing element 110 to retract wedge latch. For example, actuator may be a solenoid coupled to the wedge latch 108 and controlled by control unit 56, 76, 104. Applying power to actuator 112, control unit 56, 76, 104 causes actuator 112 to retract wedge latch 108 out of the slot formed in trailer body 112 allowing support 36, 80 to be lowered. Alternatively, actuator 112 may be a lever that can be manually operated to retract wedge latch 108.

While only a single latch system 106 is illustrated, it is envisioned that multiple latch systems will be utilized.

ALTERNATE CONFIGURATIONS: FIGS. 21-29 illustrate alternate configurations for trailer 12. Starting with FIGS. 21 and 22, Trailer 12 includes support 114 and winch lift 116. Support 118 includes a first end 118 and a second end 120. Second end 120 is pivotably coupled to trailer body 12 at or near roof 16. Winch lift 116 lowers first end 118 into the interior space of trailer 10 allowing cargo items to be placed on and removed from support 118. In this example, support 114 extends longitudinally along one half of roof 16.

Moving on to FIGS. 23 and 24, trailer 10 includes support 36 from FIGS. 3-15. However in this case, roof 16 has been modified to include fixed cage 121 attached to the roof's second section 50. Once a cargo item such as all terrain vehicle 124 is raised to roof level in support 36, it can be moved and securely stored on the second section allowing additional cargo items 126 to be stowed on support 36.

Figure 26:
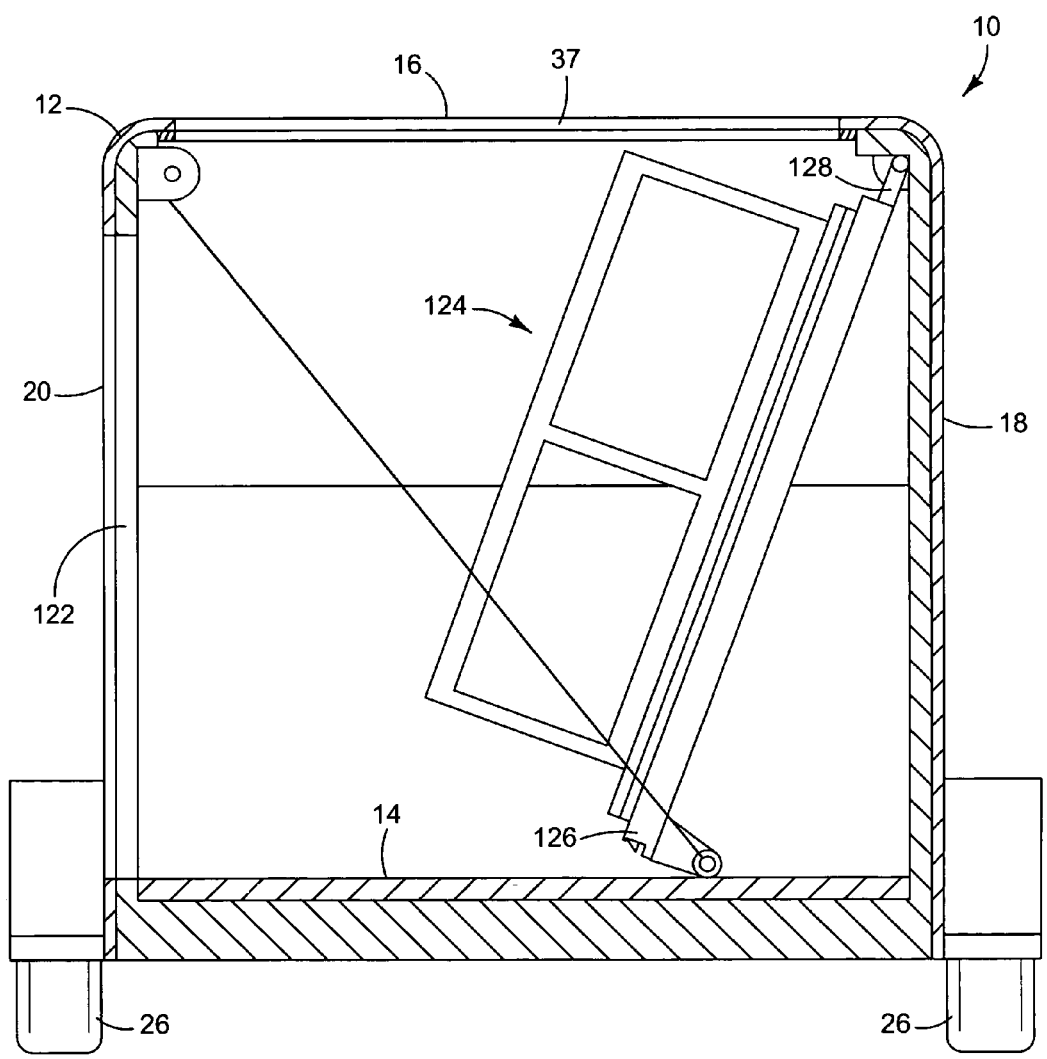
Figure 27:
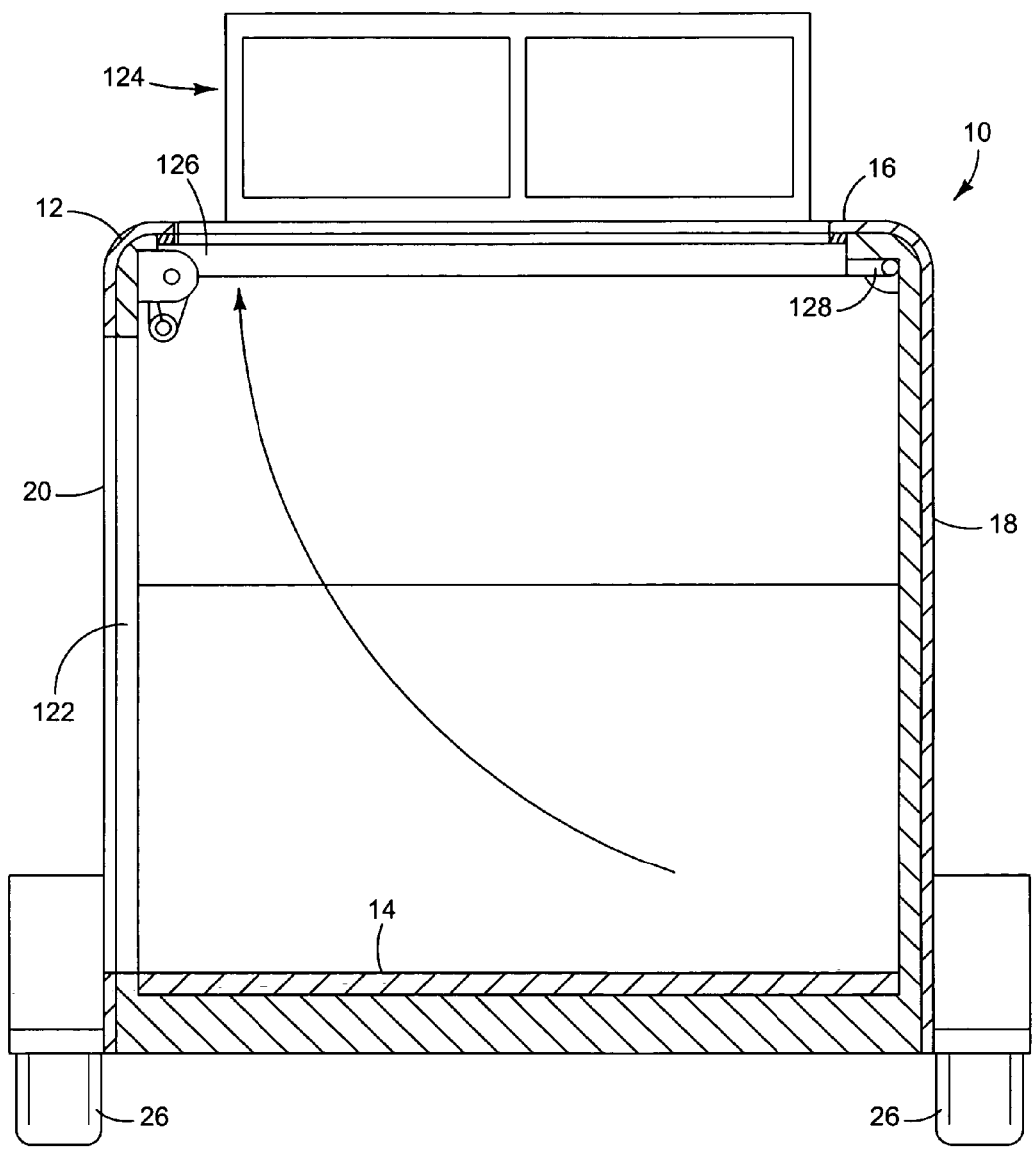
Figure 28:
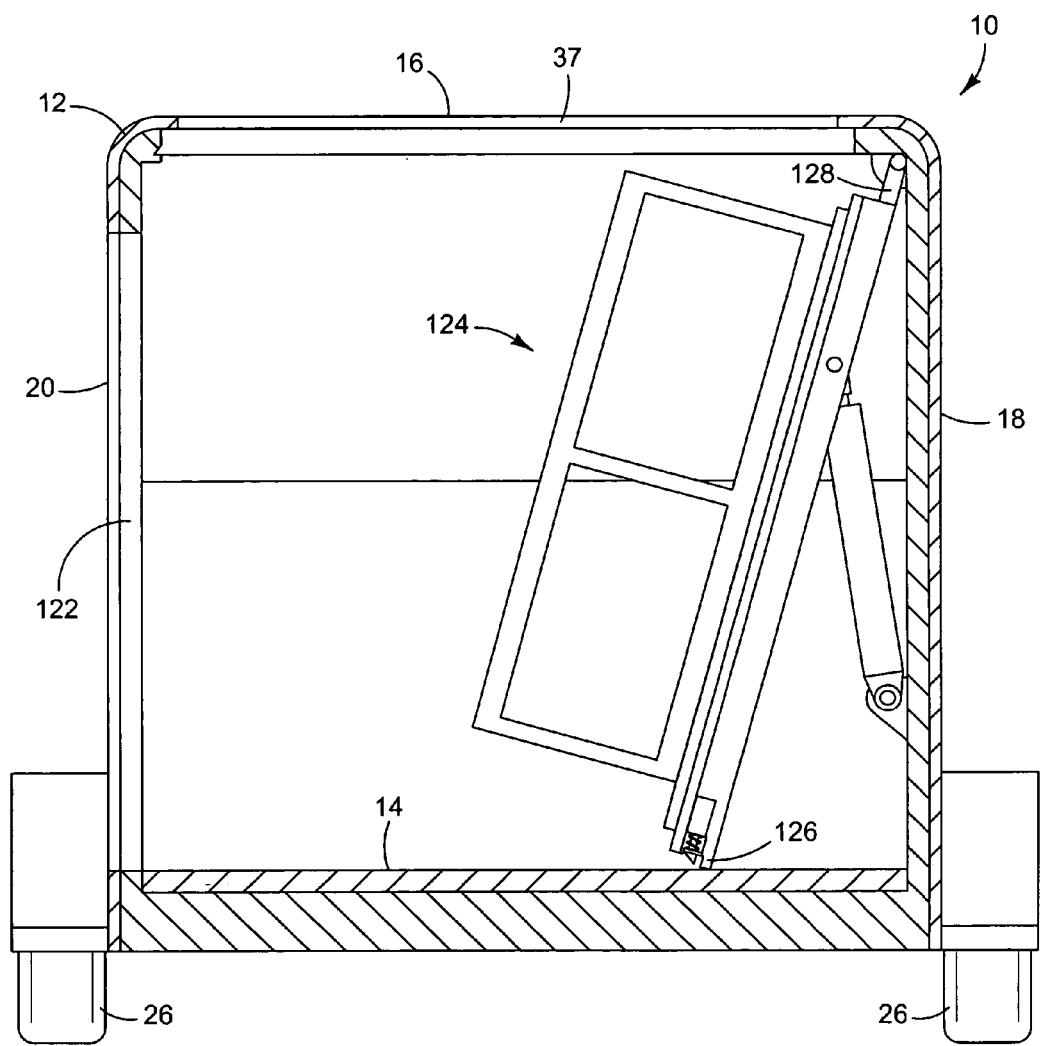
Figure 29:
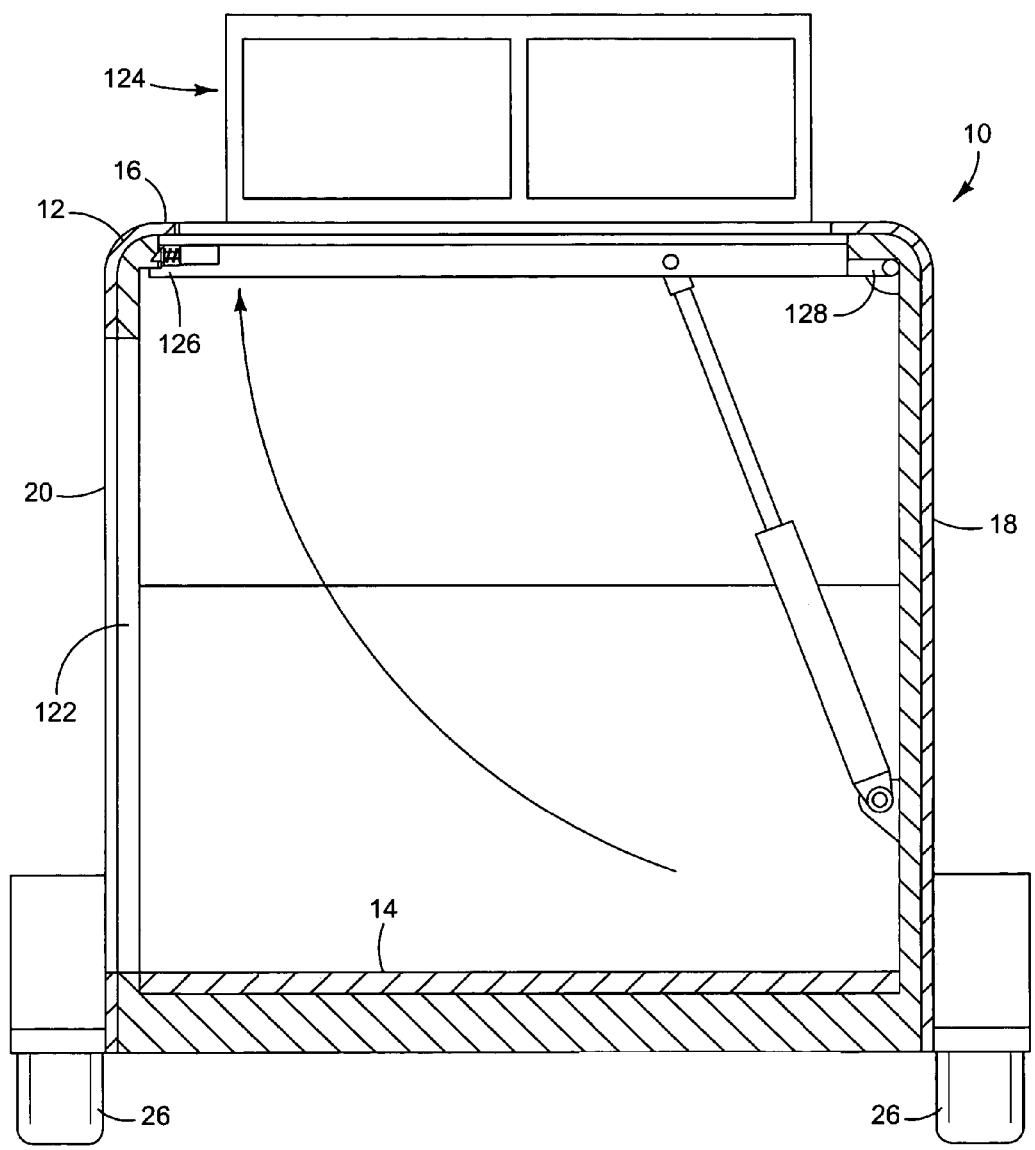

In the previous embodiments, supports 36 and 80 have been configured to be accessed via the rear of trailer 10. Moving on to FIGS. 25-29, trailer 12 includes a side door 122 through which support 124 is configured to be accessed. Support 124 includes a first end 126 and a second end 128. Second end 128 is pivotably coupled to the trailer body along an axis that is generally parallel with and adjacent to the intersection between sidewall 18 and roof 116. This allows support 124 to be pivoted between a lowered position (FIGS. 26 and 28) and a raised position (FIGS. 27 and 29). In the lowered position, cargo items can be placed on and removed from support 124 through side access door 122. In the raised position, support 124 allows for roof stowage of those cargo items. FIGS. 26 and 27 show support 124 being pivoted using winch lift 130. FIGS. 28 and 29 show support 124 being raised and lowered using hydraulic lift 132.

Figure 30:
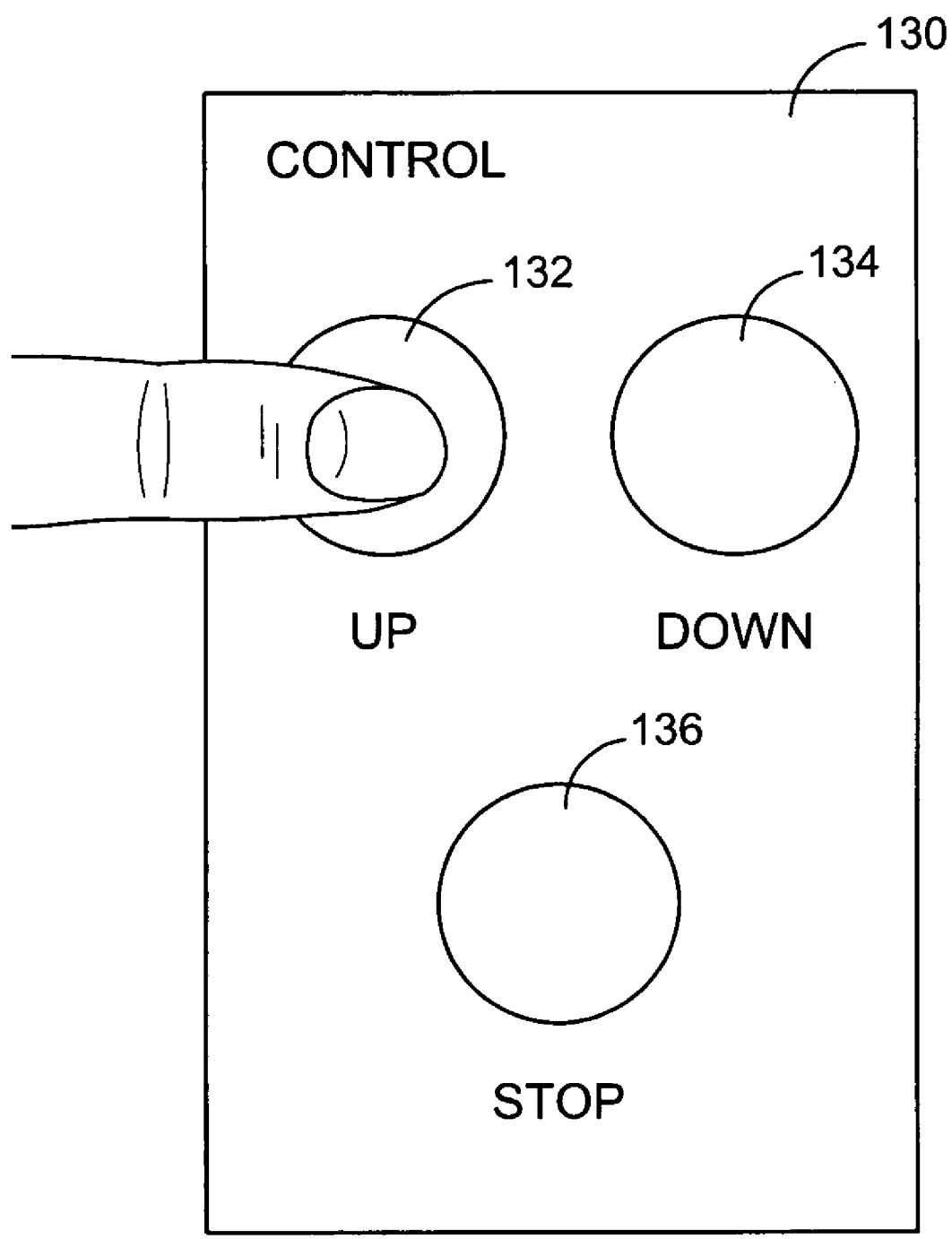

AUTOMATED CONTROL: in the various embodiments above, various control units 56, 76, 104 were described for powering and controlling lifts 34, 68, 79. These control units 56, 76, 104 may also by responsible for control latch system 106 depicted in FIG. 20. Referring now to FIG. 30, control units 56, 76, 104 may include a user interface panel 130 located, for example, on an exterior surface of trailer 10. In the Example shown, panel 130 includes buttons 132-136 for raising, lowering, and stopping the motion of supports 36, 80, 114, 124. For example, when a user presses the "up" button 132, control unit 56, 76, 104 causes lifts 34, 68, 79 to pivot supports 36, 80, 114, 124 to the raised position. When a user presses the "down" button 134, control units 56, 76, 104 cause lifts 34, 68, 79 to pivot supports 36, 80, 114, 124 to the lowered position. Selection of the "stop" button instructs control units 56, 76, 104 to stop the motion of supports 36, 80, 114, 124.

CONCLUSION: FIGS. 1 and 2 illustrate an exemplary trailer 12 in which various embodiments may be implemented. However, implementation is not limited to trailed 12 or a trailer at all for that matter. Each implementation described above included a support and a lift capable of pivoting the support between a lowered position and a raised position allowing for roof level stowage of one or more cargo items. While specific examples of different types of supports and different types of lifts were described, Implementation is not limited to shoes specific examples. In the claims that follow, the term support is used to mean any structure capable of supporting cargo items and allowing those items to be stowed at a roof level. The term lift is used to mean any mechanism capable of pivoting a support between a lowered position in which cargo items can be added or removed and a raised position in which cargo items can be stowed at roof level.

What is claimed is:

1. A roof stowage system, comprising:
    a support having a first end and a second end opposite the first end, the second end having a first pivot point at which the support is pivotably coupled, at least indirectly, to the roof;
    a lift coupled to the support and operable to selectively cause the support to pivot between a first position and a second position;
    wherein the support is generally parallel with and adjacent to the roof when in the first position; and
    wherein the first end of the support is generally adjacent to a floor when in the second position;
    wherein the support comprises:
        one or more arms each having first and second ends, the second end of each of the one or more arms being the second end of the support; and
        a planar surface having a first end and a second end opposite the planar surface first end, the planar surface having a second pivot point at which the planar surface is pivotably coupled to the one or more arms, the planar surface first end being the first end of the support, the second pivot point being different than the first pivot point.

2. The system of claim 1, wherein the lift is operable to selectively cause the support to pivot between the first position and the second position passing through an intermediate position, and wherein:
    the planar surface and the one or more arms are generally parallel when the support is pivoted at the first pivot point between the first position and the intermediate position;
    the first end of the planar surface is generally adjacent to the floor when the support is pivoted through the intermediate position; and
    the planar surface pivots relative to the one or more arms at the second pivot when the support is pivoted between the intermediate position and the second position.

3. The system of claim 2, wherein the planar surface is generally parallel and adjacent to the floor when the support is pivoted to the second position.

4. The system of claim 1, wherein the lift is coupled to the support at or near the second pivot point.

5. The system of claim 1, wherein the lift comprises a winch operable to retract and release a cable, the cable coupled to the support.

6. The system of claim 1, wherein the lift comprises a hydraulic system having one or more hydraulic cylinders and pistons coupled to the support.

7. The system of claim 1, wherein, when in the second position, the support is positioned to allow one or more items to be placed on the support and when caused, by the lift, to pivot to the first position, the support is positioned to allow roof stowage for the one or more items.

8. The system of claim 1, further comprising:
    a body defined by the roof, the floor, and opposing side walls, the body defining an interior space;
    wheels coupled to the body;
    a hitch coupled to the body for coupling the body to a vehicle;
    an opening formed in the roof;
    wherein the support is generally positioned within the opening and parallel with the roof when in the first position; and
    wherein the support is positioned within the interior space with the first end of the support generally adjacent to the floor when in the second position.

9. The system of claim 8, wherein the lift is coupled to the support at or near the second pivot point.

10. The system of claim 8, wherein the lift comprises a winch operable to retract and release a cable, the cable coupled to the support.

11. The system of claim 8, wherein the lift comprises a hydraulic system having one or more hydraulic cylinders and pistons coupled to the support.

12. The system of claim 8, wherein, when in the second position, the support is positioned within the interior space to allow one or more cargo items to be placed on the support and when caused, by the lift, to pivot to the first position, the support is positioned to allow roof stowage of the one or more items.

13. The system of claim 8, further comprising a rear access defining at least a portion of a plane that is perpendicular to the sidewalls, the floor and the roof, the rear access being positioned generally opposite the hitch relative to the body, and wherein:

the second end of the support is pivotable coupled to the body generally along an axis that is generally parallel and adjacent to the roof and generally perpendicular to the sidewalls; and when in the second position the support is positioned within the interior space and is accessible through the rear access.

14. The system of claim 13, wherein the roof includes a first section and a second section adjacent to the first section, the first section including the opening, and wherein the second end of the support is pivotably coupled to the body at or generally adjacent to the second section.

* * * * *